United States Patent [19]

Szmurlo et al.

[11] Patent Number: 5,757,312
[45] Date of Patent: May 26, 1998

[54] METHOD AND APPARATUS FOR HARD-WIRED ADAPTIVE CANCELLATION

[75] Inventors: Thomas E. Szmurlo, Palatine; Warren E. Guthrie, Wheaton, both of Ill.

[73] Assignee: Northrop Grumman Corporation, Los Angeles, Calif.

[21] Appl. No.: 811,823

[22] Filed: Mar. 4, 1997

[51] Int. Cl.$^6$ .............................. G01S 7/292; G01S 7/34; G01S 13/526
[52] U.S. Cl. .............. 342/159; 342/162; 342/194; 342/195; 342/382
[58] Field of Search .................. 342/91, 92, 93, 342/159, 162, 194, 195, 203, 379, 380, 381, 382, 383, 384

[56] References Cited

U.S. PATENT DOCUMENTS

| | | | |
|---|---|---|---|
| 3,761,923 | 9/1973 | Downie | 343/5 R |
| 3,916,408 | 10/1975 | Evans et al. | 343/100 LE |
| 4,275,397 | 6/1981 | Taylor, Jr. et al. | 342/93 |
| 4,320,535 | 3/1982 | Brady et al. | 455/278 |
| 4,381,508 | 4/1983 | Duboraw, III | 343/100 LE |
| 4,431,999 | 2/1984 | Gutleber | 342/381 |
| 4,586,048 | 4/1986 | Downie | 343/379 |
| 4,628,320 | 12/1986 | Downie | 342/16 |
| 4,689,628 | 8/1987 | Lewis | 342/384 |
| 4,697,188 | 9/1987 | Lin | 342/383 |
| 4,893,350 | 1/1990 | Minamisono et al. | 455/278 |
| 5,027,123 | 6/1991 | Haykin et al. | 342/188 |
| 5,049,890 | 9/1991 | Hansen | 342/384 |
| 5,294,933 | 3/1994 | Lee et al. | 342/159 |
| 5,493,307 | 2/1996 | Tsujimoto | 342/380 |
| 5,539,412 | 7/1996 | Mendelson | 342/192 |
| 5,703,593 | 12/1997 | Campbell et al. | 342/96 |

OTHER PUBLICATIONS

"An Interference Cancellation System for EW Applications Using an Active Device", A. Lin et al., Microwave Journal, Feb., 1992, pp. 118–128.

*Primary Examiner*—John B. Sotomayor
*Attorney, Agent, or Firm*—Terry J. Anderson; Karl J. Hoch, Jr.

[57] ABSTRACT

Hard-wired analog adaptive cancellation for microwave receivers to cancel the interference generated by co-located transmitter employs a circuit having two or more quadrature taps on a delay line. The least and greatest delays provided by the delay line taps are selected so that the copies of the transmitted signals provided by the respective taps bracket the timing of the portion of the transmitted signal that leaks into the collocated receiver's input. Samples of received signals corrupted by interference from the transmitter are mixed with delayed samples of a transmission reference signal to develop a cancellation signal.

10 Claims, 3 Drawing Sheets

METHOD AND APPARATUS FOR HARD-WIRED ADAPTIVE CANCELLATION

BACKGROUND OF THE INVENTION

The present invention pertains to the cancellation of interfering signals. More particularly, the present invention is directed to canceling interference in receivers collocated with transmitting equipment that generates interfering signals.

An adaptive canceler removes interference from within a given bandwidth by providing a signal that is matched in frequency and amplitude with, and 180 degrees out of phase from, an interfering signal. The canceler is adaptive in that it tracks the interfering signal as it varies in one or all of these dimensions over time. Adaptive cancelers provide countermeasures against radar-jamming and communication-jamming signals.

Aircraft use on-board microwave radar (OBR) for weather tracking, fire control, threat identification, etc. These systems produce high-power emissions with frequency slew rates in the MHz/msec range and employ burst continuous wave (CW), FM, and wide band Barker code phase-shift keying (BPSK) modulations. These interfere with other co-located communication, navigation, and identification (CNI) receiver systems.

This microwave interference from on-board radar can force navigation, communication, and identification receivers to be operated at reduced sensitivity levels, reducing their effectiveness and reliability. Systems employing such receivers will also be forced to waste time and computing resources trying to identify the interference. Such a misallocation of resources can be fatal to military aircraft confronting a genuine, external threat.

The antenna conventionally used for such microwave radar systems is a forward-looking semi-circular or parabolic reflector that scans the area that the aircraft is about to enter. The reflector is generally gimballed, and mounted inside a protective radome structure on the nose of an aircraft that permits the antenna to scan in a broad range of azimuth and elevation. However, the main radar antenna has backwards-looking sidelobes. These sidelobes unintentionally illuminate the antennas present in the wings, fuselage, and tail section that are used for the CNI receiver systems. These emissions are the source of the interfering signals that degrade performance.

Several variables cause the received interference signal to change in amplitude and phase, making cancellation of the interfering signal extremely difficult using conventional techniques: 1) The antenna's physical movement on the gimbal that changes its pointing angle also changes its geometric relationship to the aircraft's receiving antennas, causing phase and amplitude shifts of the interfering signal. 2) The phase center of the antenna also changes with the frequency of the transmitted signal, causing the group delay between transmitter and receiver to vary by picoseconds in a typical aircraft geometry. 3) Entirely independent of the gimballed motion, temperature changes can change the group-delay characteristics of on-board coaxial cables carrying such signals, typically on the order of a few nanoseconds. 4) Aerodynamic stresses that cause wing flutter and bending during flight, the weight of munitions carried under the wings and even changes in the fuel-level in an aircraft's wing tanks can vary the position of wing-mounted receiving antennas relative to the waterline of the aircraft's fuselage and to the transmitting antenna. These geometric changes can vary the group delay of transmitted interference signals picked up by wing-mounted receiving antennas typically by hundreds of picoseconds. It is apparent then that the interfering signal is very dynamic from environmental influences alone.

Adaptive cancelers also have many civilian applications. The ever-increasing popularity of wireless communications is making the implementation of simpler, cost effective adaptive cancelers a practical necessity. Miniaturization, and other consumer-oriented design criteria, can make isolation from interfering signals difficult or impossible. Hand-held communications devices are adding satellite up-link channels to their ground-based cellular telephone communications and, as traffic density grows, these devices become increasingly frequency-agile and interference-prone.

The active interference reduction strategy used by adaptive cancelers is risky. Small changes in the group delay of either the interfering signal or the canceling signal will result in reinforcing the interference, unless the canceling signal can track along with these changes. The cancellation signal for BPSK radar must typically remain within a 2-nanosecond cancellation window. Simple signal sampling, inversion and summing is ineffective, even counterproductive in this environment. Computer-controlled variable gain and variable delay for hard-wired signal sampling, inversion and summing, as shown in FIG. 1, have been developed to respond to such variations in the interference signal.

In particular, adaptive cancelers using acoustic charge-transport (ACT) devices as programmable transversal filters (PTF) for providing selectable gain and selectable delay have been proposed for use in electronic warfare countermeasures. These devices sample the received interference signal and perform a fast Fourier transform on it to identify its components. The computer then calculates the individual tap-weight values for the ACT's 128 taps, values that are required for it to transform the phase and amplitude of the sampled signal to values suitable for canceling the received interference signal.

The first problem with this approach to interference cancellation is one that also applies to the circuit shown in FIG. 1: all that computation takes a finite amount of time, delaying the result and risking untimely reinforcement of the interference signal. The other weaknesses of this approach are peculiar to the ACT device itself: 1) State of the art ACTs have a bandwidth of approximately 180 MHz, whereas effective OBR cancellation requires more like a 500 MHz bandwidth. This shortfall is a substantial problem. 2) ACT devices also have a very limited dynamic range, depending on the spectral spacing between input signals and the ACT devices' overall bandwidth. Outside that limited dynamic range, they generate their own added interference in the form of spurious frequencies.

SUMMARY OF THE INVENTION

In accordance with the present invention, a sample of a transmitted signal is split into zero degree and ninety degree offsets. The zero and ninety degree offsets are part of a quadrature modulator. (By way of example, a carrier of the transmitted signal may have a binary or quadrature phase shift keying (BPSK or QPSK) modulation.) The transmitted sample signal is also delayed in a delay line by a given time, and again split into zero degree and 90 degree phase offsets for quadrature modulation. A sample is obtained from a received signal, wherein the received sample includes an interfering portion of the transmitted signal. The received sample is mixed with the respective quadrature offset samples of the transmitted signal. For each set of offsets, the product component is integrated, inverted and then used to control the second respective pairs of offset mixers. The output of the second set of mixers is then combined with the received signal to at least partially cancel the transmitted signal portion in the received signal. The signal sample applied to the delay line may be referred to as a hard-wired signal, as distinguished from the free space signal radiated from the transmit antenna.

An adaptive canceler circuit in accordance with the present invention comprises a delay line with input and output taps. Further taps may be employed if desired. At each tap the transmitted signal sample is divided by a phase shift circuit into quadrature branches at zero degree and ninety degree offsets. Each of the branches includes two mixers. In each branch, the received signal sample is applied to one of the mixers, an output signal of the one mixer being integrated and applied to an input terminal of the second mixer. The outputs of the respective second mixers of the respective channels are summed and applied to the receiver to effect the cancellation.

The canceler is analog and, accordingly, operating without analog-to-digital conversion and digital computations, the response time of the canceler's control loop can be reduced below 100 nanoseconds by increasing the canceler's loop gain and using OP-amps (operational amplifiers) having a very fast slew rate to serve as the integrators. Thus, all but a small portion of the leading edge of an interfering signal can be canceled at the receiver's input.

Specifically, it has been found that a canceler in accordance with the present invention, optimized for a 9 to 10 GHz frequency range, can achieve 30 to 40 dB (decibel) reductions in interfering leakage signals for continuous (CW) and narrow-band transmitted signals. When BPSK modulation having a 20 MHz chipping rate is transmitted, the reduction in the interference produced by this wide band signal is greater than 20 dB and the canceler converges on the first pulse within less than 100 nanoseconds.

BRIEF DESCRIPTION OF THE DRAWINGS

The features and advantages of this invention will be better understood upon consideration of the detailed description of a preferred embodiment provided below is considered in conjunction with the drawing provided, wherein.

In these drawings similar structures have similar reference numerals.

DETAILED DESCRIPTION OF THE PREFERRED EMBODIMENTS

Figure 1:
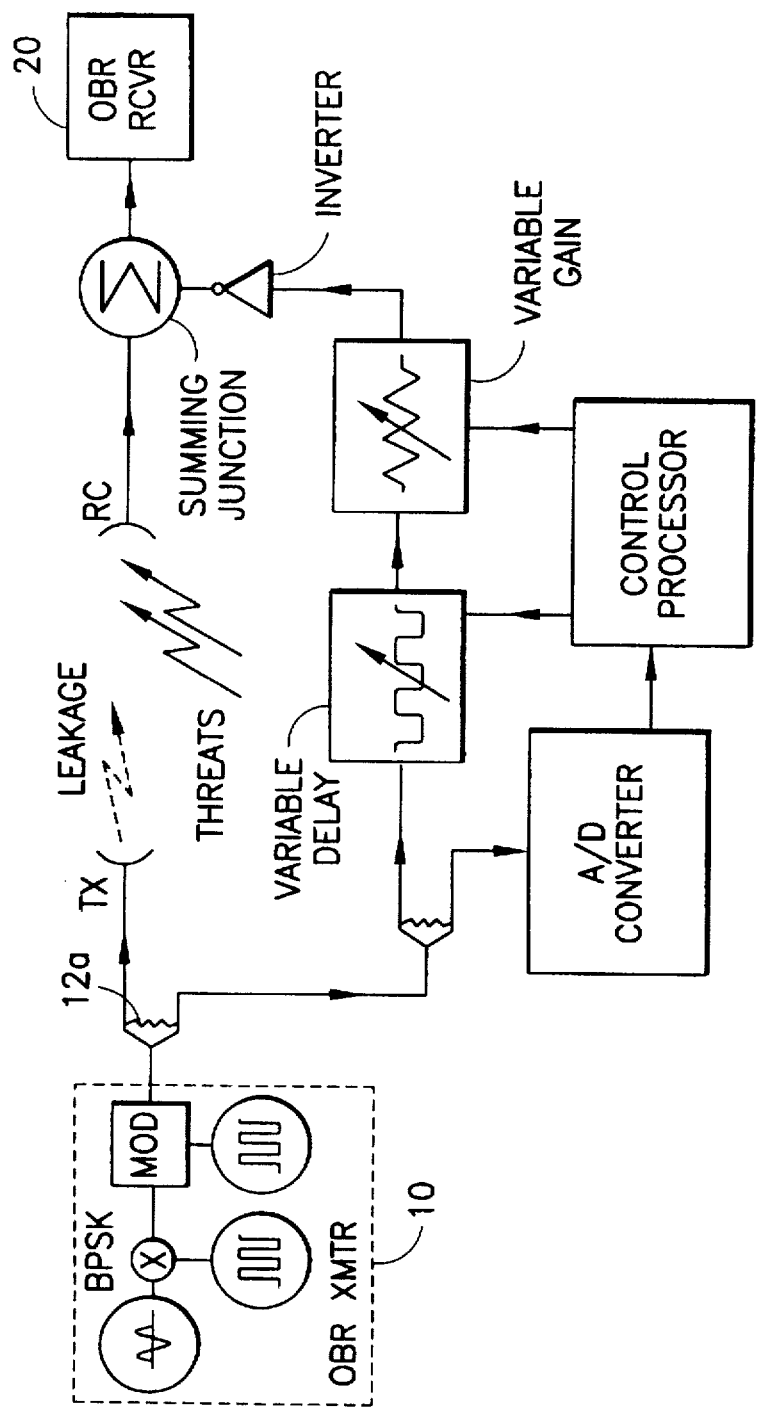
FIG. 1 is a schematic diagram showing the structure of conventional prior art adaptive cancelers.
Figure 2:
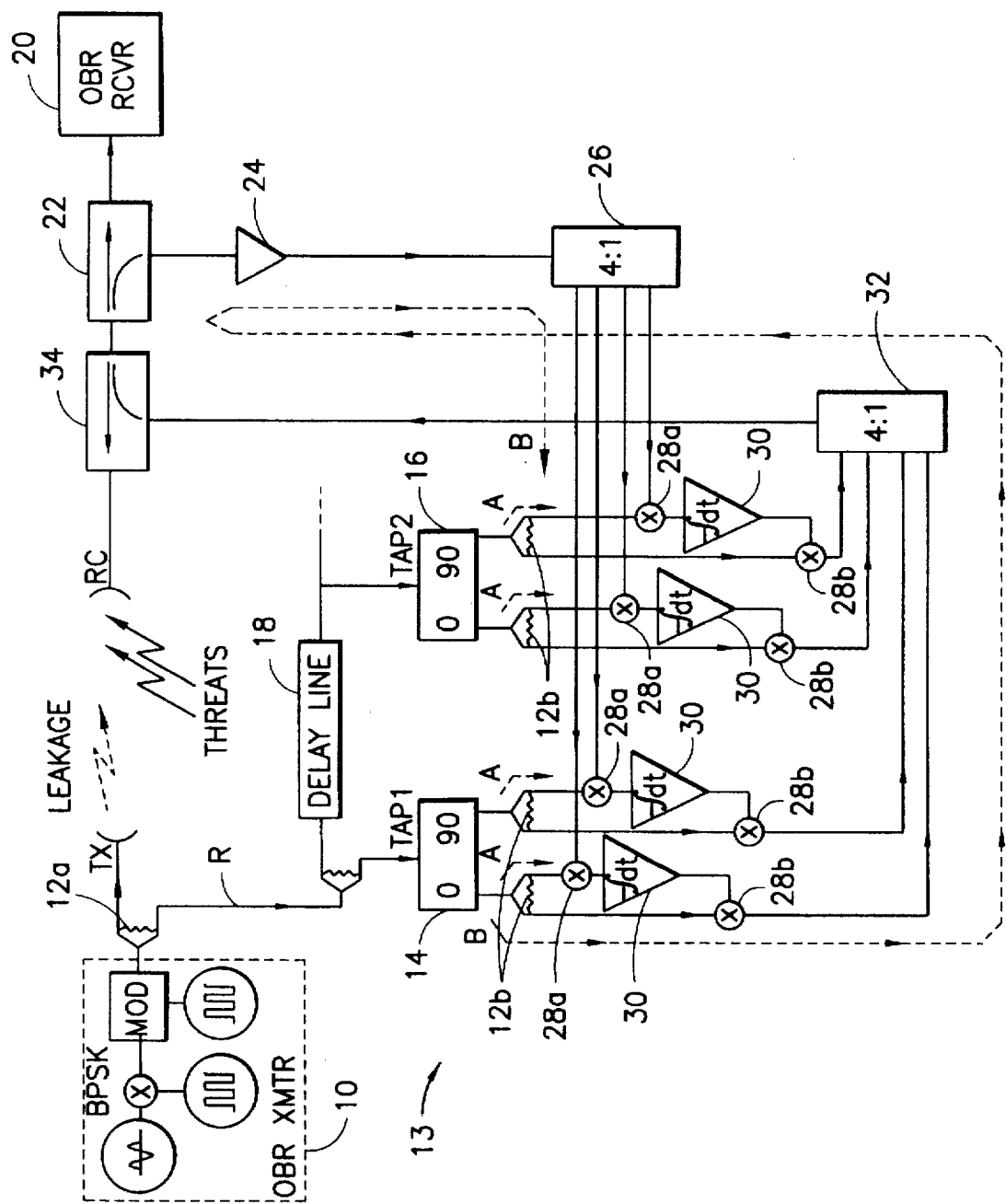
FIG. 2 is a circuit diagram of one hard-wired adaptive canceler in accordance with the present invention.

FIG. 2 shows an analog adaptive cancellation circuit, in accordance with the present invention, which is constructed in hard-wired form in a preferred embodiment of the invention. An on-board radar transmitter 10 applies samples or copies of its output transmitter signal to the transmission antenna "TX", with a copy of the output signal being applied to the canceler circuit 13 through a zero-degree phase offset, 3-dB microwave splitter 12a.

The hard wired connection from the canceler circuit 13 then supplies a reference signal, R, to two or more quadrature taps 14, 16 that act as vector modulators, adjusting the amplitude and phase of the transmitter signal. The tap signal provided by each output of the quadrature taps is amplitude and phase adjusted by a signal feedback from an input to the receiver 20 (as will be described in further detail) so that, when a sum of the weighted tap signals is injected into the input of the receiver 20, an interference, A, produced by leaked transmitter signal is canceled or at least significantly reduced.

The respective outputs of the taps 14, 16 are split into pairs of signal paths, or branches by respective zero-degree phase offset, microwave splitters 12b. The signal supplied to the second tap 16 is delayed by delay line 18 which has a(typically) 800 psec delay in a preferred embodiment of the invention. Preferably additional delays and taps are provided. For example, there may be fourteen additional taps with their corresponding signal channels to provide with the delay line 18 a 300 psec resolution to respond to environmental group delay variation. The timing range of the signals output by the taps 14, 16 having the least and greatest delays is selected to bracket their output signals within the range of expected timing variations of the transmitter signal that is picked-up as interference at the input to the receiver 20, through its antenna "RC".

The signal input to the receiver 20, including both the transmitter's interference signal and desired CNI signals at the antenna RC, is supplied to the adaptive canceler circuit 13 as a feedback signal by the first directional coupler 22. The amplitude of the feedback signal is boosted before processing in the adaptive canceler circuit 13 by a signal amplifier 24 and split into four copies by a power divider 26.

The feedback signals provided by the divider 26 are combined with respective branch signals from each of the quadrature taps 14, 16 by respective microwave mixers serving as phase detectors 28a. Each of the phase detectors 28a compares its two input signals to output a signal representing the phase difference between the two input signals. The respective output signals of the phase detectors 28a are applied to respective integrators 30 which are constructed of operational amplifiers having very-fast slew rates. The integrators 30 each integrate the respective phase differences and output a control signal. The control signals of the respective integrators 30 are applied to respective inputs of a set of microwave mixers 28b. The quadrature signal from the corresponding direct branch provided by the respective power splitter 12b is applied also to the respective mixer 28b. Connected in this way, each of the mixers 28b operates as a continuously variable bi-phase attenuator that "turns on" the signal in each channel to the extent that the hard-wired quadrature signal in that channel correlates with the interference signal.

When a correlation exists for a given branch, the inverted form of the signal of that branch is outputted from the respective mixer 28b and injected through the 4:1 power combiner 32 and via a second coupler 34 into the input of the receiver 20. Each of the mixers 28b may be regarded as a bi-phase attenuator. Each second coupler 34 is typically a 6-dB directional coupler which adds the dynamicallymodified canceler signal to the free-space signal input to the receiver 20 by the receiver's antenna "RC" that includes both interference and threat signals. Each of the second couplers 34 acts as a summing junction to its inputted signals. The interference in the combined signal that reaches the coupler 22 and receiver 20 after summing operation of the respective second coupler 34 is reduced below that appearing as input at the summing junction. This improves the quality of the desired signal by removing leaked transmitter signals and their resulting interference.

A consideration in the design of the circuit shown in FIG. 2 is that the direct hard-wired signal path A from the quadrature taps 14, 16 to each phase detector 28a must have a phase delay within 90 degrees of the feedback signal path B. Path B extends between a respective splitter 12b and its phase detector 28a via the couplers 34 and 22. For military applications, this equality of path length can be implemented by lengthening each of the cables that provide the path A links for each branch, but this may entail excessive bulk and weight of the extra cabling. For consumer applications such as hand-held cellular phone transceivers, it is preferable to reduce such a bulky and costly construction of the invention. This construction is reduced in the embodiment of FIG. 3.

Figure 3:
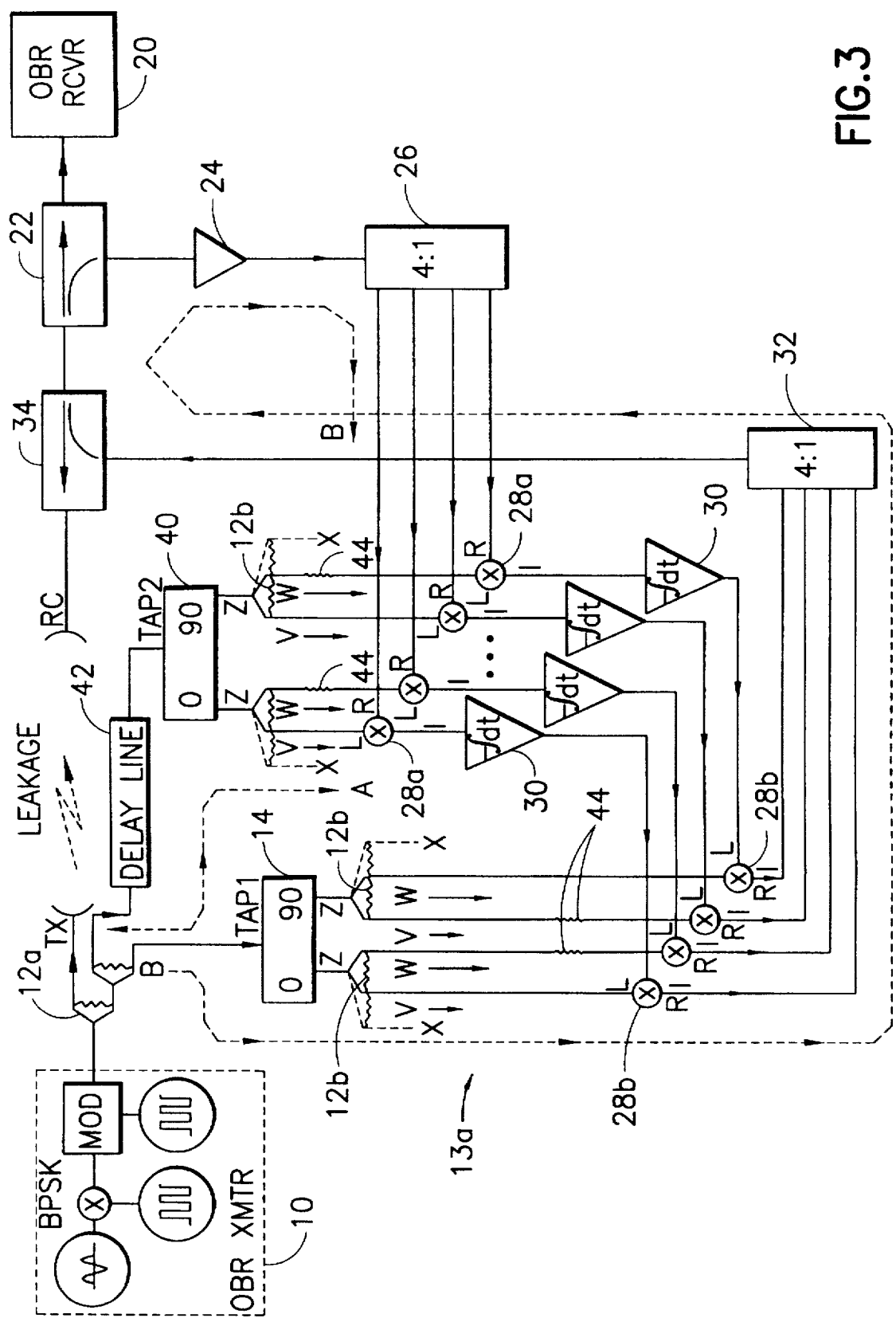
FIG. 3 is a circuit diagram of another hard-wired adaptive canceler in accordance with the present invention.

FIG. 3 shows a hard-wired analog adaptive cancellation circuit 13a in accordance with a second, preferred embodiment of the invention. Again, an on-board radar (OBR) transmitter 10 supplies two copies of its output signal, one to the transmission antenna TX and the other to the canceler circuit 13a through a zero degree phase offset, 3-dB microwave splitter 12a. By means of the hard wired connection from the splitter 12a to the canceler circuit 13A, the splitter 12a then supplies the transmitter signal to two or more quadrature taps 14, 40 that act as respective vector modulators for adjusting the amplitude and phase of the transmitter signal. Thereby, upon injection of the modulated transmitter signal via the cancellation circuit 13a back into the input of the receiver 20, the interference produced by the transmitter is canceled.

The respective outputs of the taps 14, 40 are split into pairs of branches, by respective zero-degree phase offset, microwave splitters 12b. The respective outputs of the quadrature taps 14, 40 are connected to the splitters by links having a given path length value Z matched to 90° relative to the given cancellation-frequency bandwidth of interest. The signal supplied to the second tap 40 is delayed by a single delay line 42 from the signal at the tap 14. This provides the bulk phase match of the signal paths followed by the transmitter signal and the feedback signal, as is described further below with reference to the phase-comparison operation of the phase detectors 28a. It is noted that in FIG. 3, only one bulk delay line is used, whereas in FIG. 2, four bulk delay lines are required.

The paths in each pair of paths on each side of each quadrature tap also have respective given, path length values, V, and W matched to 90°, for the given cancellation-frequency bandwidth. Each path having the W effective path length is extended by a suitable delay element 44. However, the physical dimensions of these delay elements are relatively small unlike the substantial length of coaxial cable required for the phase-adjustment delay provided by the delay line 18 in the embodiment of FIG. 2 or delay line 42 in FIG. 3.

With reference to FIG. 3, finer resolution may be provided by adding branches and corresponding additional taps to the delay line 42, the additional taps having different delay values. The timing difference between signal paths X and W having the least and greatest delays, respectively, is selected so as to bracket the expected timing variation in that portion of the transmitted signal that is picked-up as interference at the input to the receiver 20, either through the receiving antenna RC or by leakage into the receiver input.

In operation, a copy of the free-space signal is received by the receiver 20 of FIGS. 2 and 3. In addition, the receiver 20 receives the transmitter's leaked interference signal and desired CNI signals. The sum of the foregoing three signals is supplied to the adaptive canceler circuit 13, 13a by the first coupler 22. With reference to the embodiment of FIG. 3, the amplitude of the composite feedback signal is boosted by the signal amplifier 24 and then split into four feedback signals in four respective feedback-loop paths by the power divider 26.

These four feedback signals are combined with the four respective signal paths from the delayed-signal quadrature tap 40 by respective first microwave mixers serving as phase detectors 28a. The delay provided by the delay line 42 is selected so as to provide correct phase matching between the two input paths A and B for each of the quadrature taps that are connected to the phase detectors 28a. One of the two paths from the splitter 12a on each side of the delayed-signal quadrature tap 40 is effectively lengthened by a delay 44 so as to bracket the expected timing of the interference signal.

The phase detectors 28a compare the hard-wired signal at each detector's L port to the free space feedback signal at the detector's R port. The correlation of the combined signals with the respective hard-wired signals is then filtered by use of the integrators 30 connected to the I port of the respective microwave mixers 28b. The inverted output of each of the integrators 30 is supplied to the I port of the corresponding mixer 28b. The respective quadrature signal from the respective splitter 12b, at the tap 14, is supplied to the L port of the respective mixers 28b. Thereby, the respective mixers 28b operate as bi-phase attenuators.

When a correlation exists for a given tap, the signal is outputted from the R port of the mixer 28b to be applied via the 4:1 power combiner 32 and the coupler 34 into the input to the receiver 20. The directional coupler 34 provides a summing junction for the canceler signal and the signal input to the receiver 20 from the receivers antenna RC. The interference level in the signal at the receiver will be lower than that at the receiver antenna RC, reducing the correlation between the hard-wired signal and interference in the feedback signal received from the first directional coupler 22.

The copies of the transmitted signals provided by the outputs of the taps 14, 16 slightly lead and lag the expected free-space delay of the interfering transmitted signal detected at the receiver input, so as to arrive at the summing junction 34 just before and just after the interference signal.

When multiple taps are provided, the adaptive-canceler circuit can respond to a greater range of increases and decreases in the phase shift and the group delay of the transmitter's interference signal relative to the hard-wired transmitter signal. Multiple taps assure that a suitable cancellation signal is available from among the multiple copies of the transmitted signal that bracket the timing of the received interference signal.

The total amount of delay provided for the cancellation signal is chosen to cover the anticipated range of variation in group delay of the received interference signal. Tap spacing is chosen so as to minimize mismatch between the transmitter's free space signal path and the hard-wired, adaptive-canceler signal path. The trade-off is that closer tap spacing requires more hardware for a given delay length.

The invention has been described with particular reference to presently preferred embodiments thereof, but it will be apparent to one skilled in the art that variations and modifications are possible within the spirit and scope of this invention.

For example, the adaptive canceler might be hard wired to a signal synthesizer that approximates the underlying frequency components of the transmitted interfering signal in some suitable manner known in the art, where those underlying components are predictable enough or stable enough to be simulated and the adaptive canceler cannot be hard wired to the transmitted signal. The adaptive canceler can also be used to protect cellular phone transceivers, instead of radar devices, as mentioned earlier. The invention is defined by the appended claims.

What is claimed is:

1. A method of adaptive cancellation of the interference in a received signal resulting from a transmitted signal, said method comprising the steps of:

splitting a sample of a transmitted signal among a plurality of signal channels;

delaying a signal of a first of said channels relative to a signal of a second of said channels by a delay;

splitting the signals in each of said respective signal channels into first and second branch signals which are in phase quadrature;

mixing a feedback signal extracted from the received signal with the first branch signal in each of a first plurality of said channels to produce respective phase-comparison signals;

mixing respective ones of said phase-comparison signals with said first branch signals in individual ones of said channels to produce cancellation signals; and summing said cancellation signals with the received signal to cancel at least a portion of the interference within the received signal.

2. The method of claim 1 wherein said interfering signal is a transmitter signal, further including the step of integrating and inverting said first plurality of respective phase-comparison signals.

3. The method of claim 1 wherein said given group delay brackets an expected range of delays between transmission and reception timing of said interference in the received signal.

4. The method of claim 3 wherein said delay is a first delay, further including steps of:

splitting each of said branch signals into first and second sections; and inserting a second delay into the first section in each of said branches of a second of said channels to equalize signal propagation paths, said second delay being equal to said first delay.

5. An adaptive canceler circuit suitable for use with a system having a transmitter and a receiver wherein a portion of a transmitted signal from said transmitter may be received as interference at said receiver, said canceler circuit serving for canceling interference in a received signal, said canceler circuit comprising:

a reference signal input terminal for receiving a sample of an interfering signal;

a delay line connected to said reference input terminal for delaying said reference signal;

first and second signal channels having respectively first and second taps connected respectively to first and second terminals of said delay line, each of said taps being a quadrature tap outputting inphase and quadrature signals to inphase and quadrature branches in each of said channels;

a plurality of signal splitters located in respective ones of said branches in each of said channels, each of said splitters dividing a signal between a first signal path and a second signal path in each of said respective branches;

a first mixer disposed in only the first path in each branch of said first and said second channels, and a second mixer disposed in only the second path in each branch of said first and said second channels;

a set of integrators located in respective ones of said branches wherein, in each of said branches, a respective one of said integrators serves to integrate an output signal of a respective one of said second mixers and to apply a resulting integrated signal to a respective one of said first mixers;

a combined signal input terminal providing a sample of a combined signal composed of a received signal corrupted by interference of said reference signal, and a power divider for directing a signal received at said combined input terminal to all of said second mixers of said first and said second channels;

wherein said second mixers are operative to mix a signal of said delay line with said combined signal sample for outputting mixed signals to respective ones of said integrators; said first mixers are operative to mix said reference signal with integrated signals provided by respective ones of said integrators; and said adaptive canceler circuit further comprises an output cancellation terminal for injecting a cancellation signal from the canceler circuit into the received signal for reducing the interference, and a summer for summing output signals of all of said first mixers to provide the cancellation signal.

6. An adaptive canceler circuit according to claim 5 wherein a delay imparted to the reference signal by said delay line brackets a time of propagation of a transmitted signal from the transmitter to the receiver.

7. An adaptive canceler circuit according to claim 5 wherein each of said first mixers is operative as a phase detector.

8. An adaptive canceler circuit suitable for use with a system having a transmitter and a receiver wherein a portion of a transmitted signal from said transmitter may be received as interference at said receiver, said canceler circuit serving for canceling interference in a received signal, said canceler circuit comprising:

a reference signal input terminal for receiving a sample of an interfering signal;

a delay line connected to said reference input terminal for delaying said reference signal;

first and second signal channels having respectively first and second taps connected respectively to first and second terminals of said delay line, each of said taps being a quadrature tap outputting inphase and quadrature signals to inphase and quadrature branches in each of said channels;

a plurality of signal splitters located in respective ones of said branches in each of said channels, each of said splitters dividing a signal between a first signal path and a second signal path in each of said respective branches;

a first mixer disposed in each path in each branch of said first channel and a second mixer disposed in each path in each branch of said second channel;

a plurality of delay units located in each of respective branches of said second channel, each of said delay units being connected in only one path of each branch between a respective one of said splitters and a respective one of said second mixers;

each of a set of integrators for integrating output signals of respective ones of said second mixers in respective ones of said paths of said second channel, said integrators applying integrated signals to respective ones of said first mixers in said first channel;

a combined signal input terminal providing a sample of a combined signal composed of a received signal corrupted by interference of said reference signal, and a power divider for directing a signal received at said combined input terminal to all of said second mixers of said second channel;

wherein said second mixers are operative to mix a signal of said delay line with said combined signal sample for outputting mixed signals to respective ones of said integrators;

said first mixers are operative to mix said reference signal with integrated signals provided by respective ones of said integrators; and said adaptive canceler circuit further comprises an output cancellation terminal for injecting a cancellation signal from the canceler circuit into the received signal for reducing the interference, and a summer for summing output signals of all of said first mixers to provide the cancellation signal.

9. An adaptive canceler circuit according to claim 8 wherein a delay imparted to the reference signal by said delay line brackets a time of propagation of a transmitted signal from the transmitter to the receiver.

10. An adaptive canceler circuit according to claim 9 wherein each of said first mixers is operative as a phase detector.

* * * * *

UNITED STATES PATENT AND TRADEMARK OFFICE
CERTIFICATE OF CORRECTION

PATENT NO. : 5,757,312
DATED : May 26, 1998
INVENTOR(S) : Thomas E. Szmurlo, Warren E. Guthrie It is certified that error appears in the above-identified patent and that said Letters Patent is hereby corrected as shown below:

<u>Column 1,</u>
Line 2, please add:

STATEMENT OF GOVERNMENT OF RIGHTS

This invention was made with Government support under contract F33657-91-C-0034 awarded by the United States Air Force. The Government has certain rights in this invention.

Signed and Sealed this

Eleventh Day of December, 2001

Attest:

NICHOLAS P. GODICI
Attesting Officer
Acting Director of the United States Patent and Trademark Office